United States Patent [19]

Shimoda et al.

[11] 4,247,878
[45] Jan. 27, 1981

[54] MULTI-CHANNEL MAGNETIC HEAD WITH A PLURALITY OF CORES AND METHOD FOR MANUFACTURING THE CORES

[75] Inventors: Misao Shimoda, Tokyo; Sinichi Saitou, Hachioji, both of Japan

[73] Assignee: Olympus Optical Co., Ltd., Tokyo, Japan

[21] Appl. No.: 12,199

[22] Filed: Feb. 14, 1979

[30] Foreign Application Priority Data

Feb. 27, 1978 [JP] Japan ................................. 53-21785
Feb. 27, 1978 [JP] Japan ................................. 53-21786

[51] Int. Cl.³ .............................................. G11B 5/22
[52] U.S. Cl. .................................... 360/125; 360/122
[58] Field of Search ...................... 360/125, 121–123, 360/119

[56] References Cited

FOREIGN PATENT DOCUMENTS 526005 11/1976 U.S.S.R. .................................... 360/121

OTHER PUBLICATIONS

IBM/TDB, vol. 15, No. 6, Nov. 1972, "Interleaved Multielement Magnetic Head" by Kington.

IBM/TDB, vol. 9, No. 7, Dec. 1966, "Edge Effect Magnetic Recording" by Dawson et al.

Primary Examiner—John H. Wolff

[57] ABSTRACT

A multi-channel magnetic head used with a magnetic tape comprises a core housing and a plurality of U-shaped cores disposed in the core housing. Each U-shaped core is inclined to the running direction of the magnetic tape at such an angle that its legs trace different tracks of the tape. The U-shaped cores are juxtaposed widthwise of the tape at such regular intervals that the legs of any adjacent two cores trace different tracks of the tape.

A method for manufacturing U-shaped cores of a multi-channel magnetic head used with a magnetic tape. The method comprises steps of forming a U-shaped groove in core material in the form of an elongated tetragonal prism on one long face thereof, said groove extending in the lengthwise direction of the core material; cutting the edges of two walls defining the U-shaped groove therebetween to form wedges of an acute angle; and slicing the core material slantwise with respect to the axis of the U-shaped groove.

2 Claims, 13 Drawing Figures

MULTI-CHANNEL MAGNETIC HEAD WITH A PLURALITY OF CORES AND METHOD FOR MANUFACTURING THE CORES

BACKGROUND OF THE INVENTION

This invention relates to a multi-channel magnetic head comprising a plurality of cores for generating a magnetic field extending perpendicular to the recording surface of a magnetic tape and also to a method for manufacturing the cores.

A multi-channel magnetic head with a plurality of U-shaped cores has been used in various apparatus using a magnetic tape. While the magnetic head is in operative position, the cores are put in contact with the recording surface of the tape and generate a magnetic field which extends perpendicular to the recording surface of the tape, thereby achieving recording and reproduction with a high precision.

If the space between the legs of each U-shaped core is too narrow, the density of magnetic flux penetrating the magnetic tape is inevitably reduced, and a high-precision recording or reproduction becomes impossible. If the space is too broad, the core inevitably becomes large. As a result, the multi-channel magnetic head, which comprises two or more cores, also becomes large and more costly. Further, this makes it necessary to use a magnetic tape of a larger width.

SUMMARY OF THE INVENTION

Accordingly, it is an object of this invention to provide a multi-channel magnetic head with a plurality of U-shaped cores, which can be made small without reducing the density of magnetic flux penetrating a magnetic tape.

Another object of this invention is to provide a method for manufacturing cores to constitute a multi-channel magnetic head which can be made small without reducing the density of magnetic flux penetrating a magnetic tape.

According to this invention there is provided a multi-channel magnetic head for use with a magnetic tape, comprising a core housing with a head face and a plurality of U-shaped cores disposed in the core housing, each of said cores being inclined to the running direction of the tape at such an angle that its legs trace different tracks of the tape, and said cores being juxtaposed widthwise of the tape at such regular intervals that the legs of any adjacent two cores trace different tracks of the tape.

Further, according to this invention there is provided a method for manufacturing U-shaped cores of a multi-channel magnetic head comprising the steps of forming a U-shaped groove in core material in the form of an elongated tetragonal prism on one long face thereof, said groove extending in the lengthwise direction of the core material, cutting the edges of two walls defining the U-shaped groove therebetween to form wedges of an acute angle, and slicing the core material slantwise with respect to the axis of the U-shaped groove.

DETAILED DESCRIPTION OF THE PREFERRED EMBODIMENTS

Figure 1:
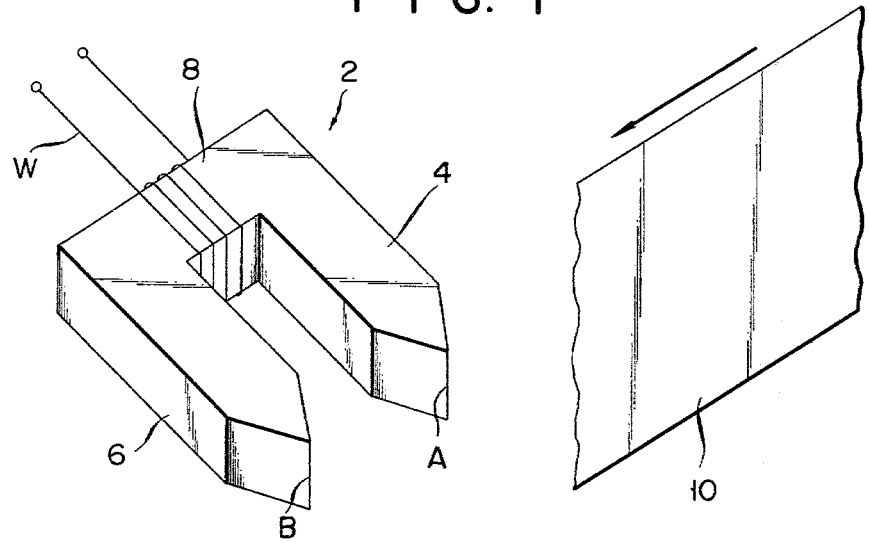
FIG. 1 is a perspective view of one of the cores constituting a magnetic head according to this invention.
Figure 2A:
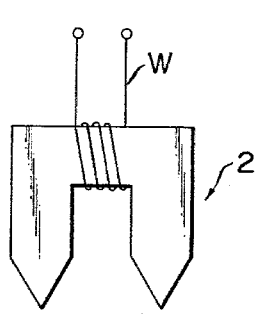
FIGS. 2A, 2B and 2C are a front view, a bottom plan view and a side view respectively of the core shown in FIG. 1.
Figure 2B:
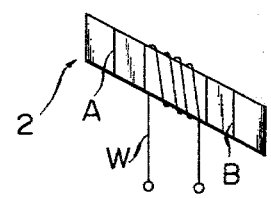
Figure 2C:
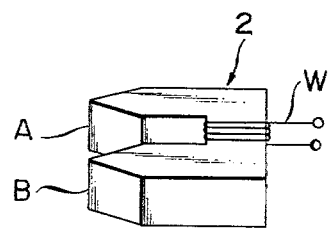

Now referring to FIGS. 1 to 6, a magnetic head according to this invention will be described. As shown in FIG. 1, each of the cores 2 constituting the magnetic head is U-shaped and has a pair of legs 4 and 6. The tips of the legs 4 and 5 are shaped like a wedge and provided with ridges A and B, respectively. About the trunk 8 of the core 2 a coil W is wound. The core 2 is positioned to have the ridges A and B extending perpendicular to the running direction of a magnetic tape 10, which direction is indicated by an arrow in FIG. 1. The shape of the core 2 is more fully represented by FIGS. 2A, 2B and 2C, i.e. front view, bottom plan view and side view.

Figure 3:
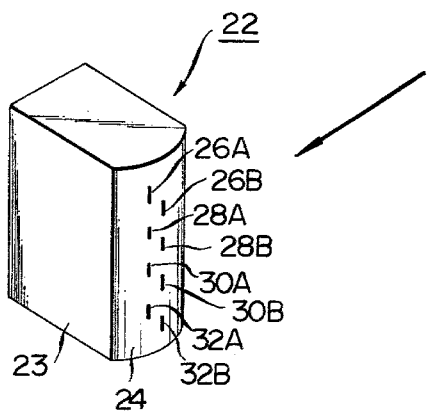
FIG. 3 is a perspective view of a magnetic head according to this invention, comprising a plurality of such cores as illustrated in FIG. 1.

FIG. 3 shows a magnetic head 22 of this invention comprising such four U-shaped cores 26, 28, 30 and 32 as shown in FIGS. 1 and 2A to 2C. The magnetic head 22 further comprises a housing 23 with a head face 24 which faces the magnetic tape 10. Inside the housing 23 the cores 26, 28, 30 and 32 are arranged side by side in the lengthwise direction of the head face 24 or in the widthwise direction of the magnetic tape 10. From the head face 24 the ridges 26A, 26B of the core 26, the ridges 28A and 28B of the core 28, the ridges 30A and 30B of the core 30 and the ridges 32A and 32B of the core 32 protrude a little as shown in FIG. 3. The arrow in FIG. 3 indicates the running direction of the tape 10.

Figure 4:
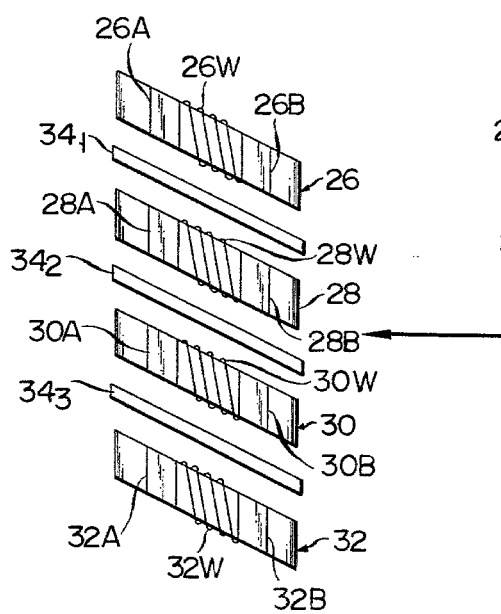
FIG. 4 shows an arrangement of cores in the magnetic head shown in FIG. 3, as viewed from the head face of the magnetic head.
Figure 5:
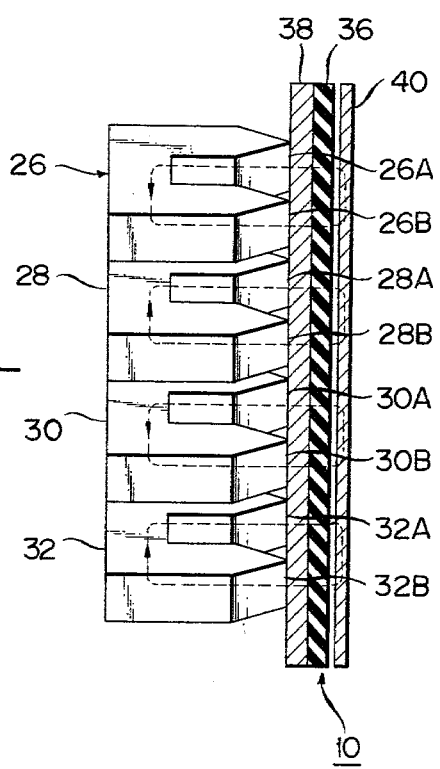
FIG. 5 shows the arrangement of cores in the magnetic head shown in FIG. 3, as viewed from one side of the magnetic head.

With reference to FIGS. 4 and 5 it will be described more in detail how the cores 26, 28, 30 and 32 are arranged in the housing 23. FIG. 4 shows the cores 26, 28, 30 and 32 as viewed from the head face 24, and FIG. 5 shows them as viewed in the tape running direction which is indicated by the arrow in FIG. 4. As FIGS. 4 and 5 clearly illustrate, the cores 26, 28, 30 and 32 are spaced at such regular intervals in the widthwise direction of the tape 10 and inclined at such an angle to the running direction of the tape 10 that their ridges 26A, 26B, 28A, 28B, 30A, 30B, 32A and 32B trace different tracks of the magnetic tape 10. In other words, as shown in FIG. 5, the four cores are arranged in the housing 23 in such a manner that their ridges do not overlap at all as viewed in the running direction of the magnetic tape 10. For example, the ridges 28A and 28B of the core 28 are spaced from, and do not overlap with, the ridge 26B of the core 26 and the ridge 30A of the core 30, respectively, as viewed in the running direction of the tape 10. In short, the ridges of the cores 26, 28, 30 and 32 are arranged on the head face 24 in zigzag fashion as shown in FIG. 3.

As shown in FIG. 4, the magnetic head 22 further comprises three shields $34_1$, $34_2$ and $34_3$. The shields $34_1$, $34_2$ and $34_3$ are interposed between the cores 26 and 28, between the cores 28 and 30 and between the cores 30 and 32, thereby to prevent interference between the magnetic fields generated by the cores 26, 28, 30 and 32.

FIG. 5 shows the cores 26, 28, 30 and 32 having their ridges in contact with the magnetic tape 10. The tape 10 is constituted by a plastic film 36 and an anisotropic magnetic film 38 laid on the plastic film 36. The magnetic film 38 is in contact with the ridges of the cores 26, 28, 30 and 32. The tape 10 is sandwiched between the ridges of the cores and a plate 40 having a high magnetic permeability.

To operate the magnetic head 22, electric current is made to flow in coils 26W, 28W, 30W and 32W wound about the cores 26, 28, 30 and 32, respectively. Then, each core generates a magnetic path which starts at one ridge, penetrates the tape 10 perpendicularly, extends in the plate 40 and returns to the other ridge, as illustrated in FIG. 5. Since the space between the legs of each core is relatively large, the magnetic head 22 can achieve a high-precision recording on the magnetic film 38.

As mentioned above, in the housing 23 the cores are spaced at such regular intervals in the widthwise direction of the tape and inclined at such an angle to the running direction of the tape that their ridges do not overlap as viewed in the running direction of the tape. For this reason, the magnetic head of this invention can be made small and can yet achieve a high-precision recording without reducing the density of magnetic flux penetrating the magnetic tape.

It is preferable that the wedge-shaped tips of each core should have an acute angle. Because of this, the tips are so sharply shaped, the density of magnetic flux penetrating the magnetic tape will be increased.

The above-described magnetic head 22 comprises four cores 26, 28, 30 and 32. This invention need not be limited to this embodiment. The magnetic head according to this invention may comprise two, three U-shaped cores or five or more U-shaped cores.

Figure 6A:
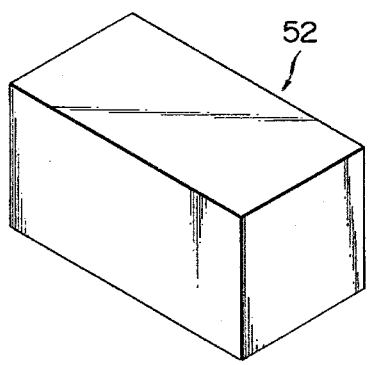
FIGS. 6A, 6B, 6C, 6D and 6E show how the core shown in FIG. 1 is manufactured.
Figure 6B:
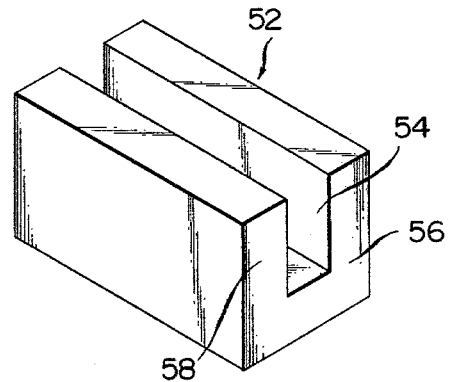
Figure 6C:
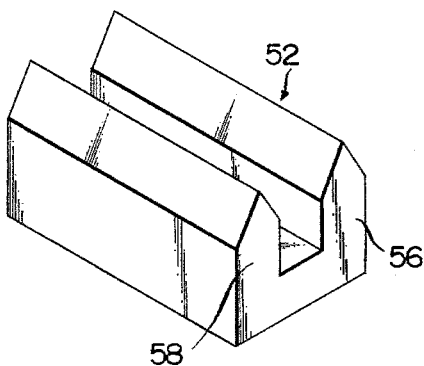
Figure 6D:
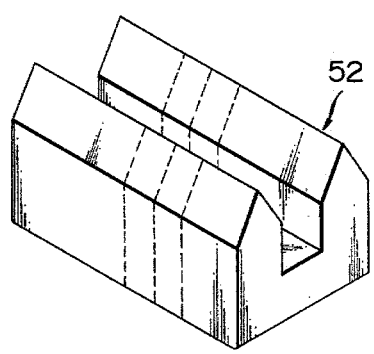
Figure 6E:
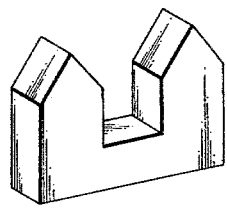
Figure 7:
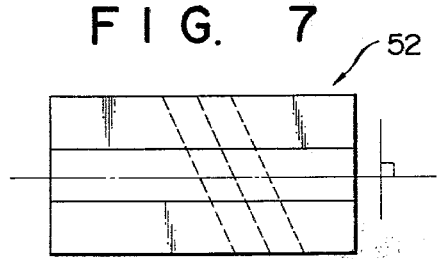
FIG. 7 is a plan view of a core material illustrated in FIG. 6D.

The cores shown in FIGS. 1 and 2A to 2C can be easily manufactured in large quantities by a method as illustrated in FIGS. 6A to 6E. First, a core material 52 in the form of an elongated tetragonal prims is prepared, which is illustrated in FIG. 6A. Then, a U-shaped groove 54 is formed in the core material 52 extending in the lengthwise direction of the core material 52, as shown in FIG. 6B. The walls 56 and 58 defining the groove 54 between them are cut to have their edges shaped like a wedge, as illustrated in FIG. 6C. The wedge-shaped edges have an acute angle. Thereafter, the core material 52 is sliced along dotted lines shown in FIG. 6D, thereby providing such U-shaped cores as shown in FIG. 6E. The core material 52 is sliced slantwise with respect to the axis of the U-shaped groove 54 as illustraed in FIG. 7 which is a plan view of the core material 52.

Thus, according to the present invention there is also provided a method which can manufacture easily and in large quantities U-shaped cores for a multi-channel magnetic head.

What we claim is;

1. A multi-channel magnetic head for contacting a magnetic tape, comprising: a core housing having a head face, and a plurality of U-shaped cores arranged in said housing, each core being wound by an exciting coil and the free ends of each said core defining a pair of spaced legs, said cores extending in a row such that each of the legs of said cores defines a separate row along the head face, said cores being inclined with respect to a direction which extends perpendicular to said row and essentially parallel to said head face, at an angle such that each of said pair of spaced legs defines a distinct head face tip portion and is adapted to engage a different track of a contacting magnetic tape when moving in said direction.

2. A multi-channel magnetic head according to claim 1, wherein the legs of each U-shaped core are wedge-shaped at tip portions to have ridges.

* * * * *